Jan. 16, 1962    H. V. REED    3,017,003
CLUTCH
Filed Nov. 24, 1958    2 Sheets-Sheet 1
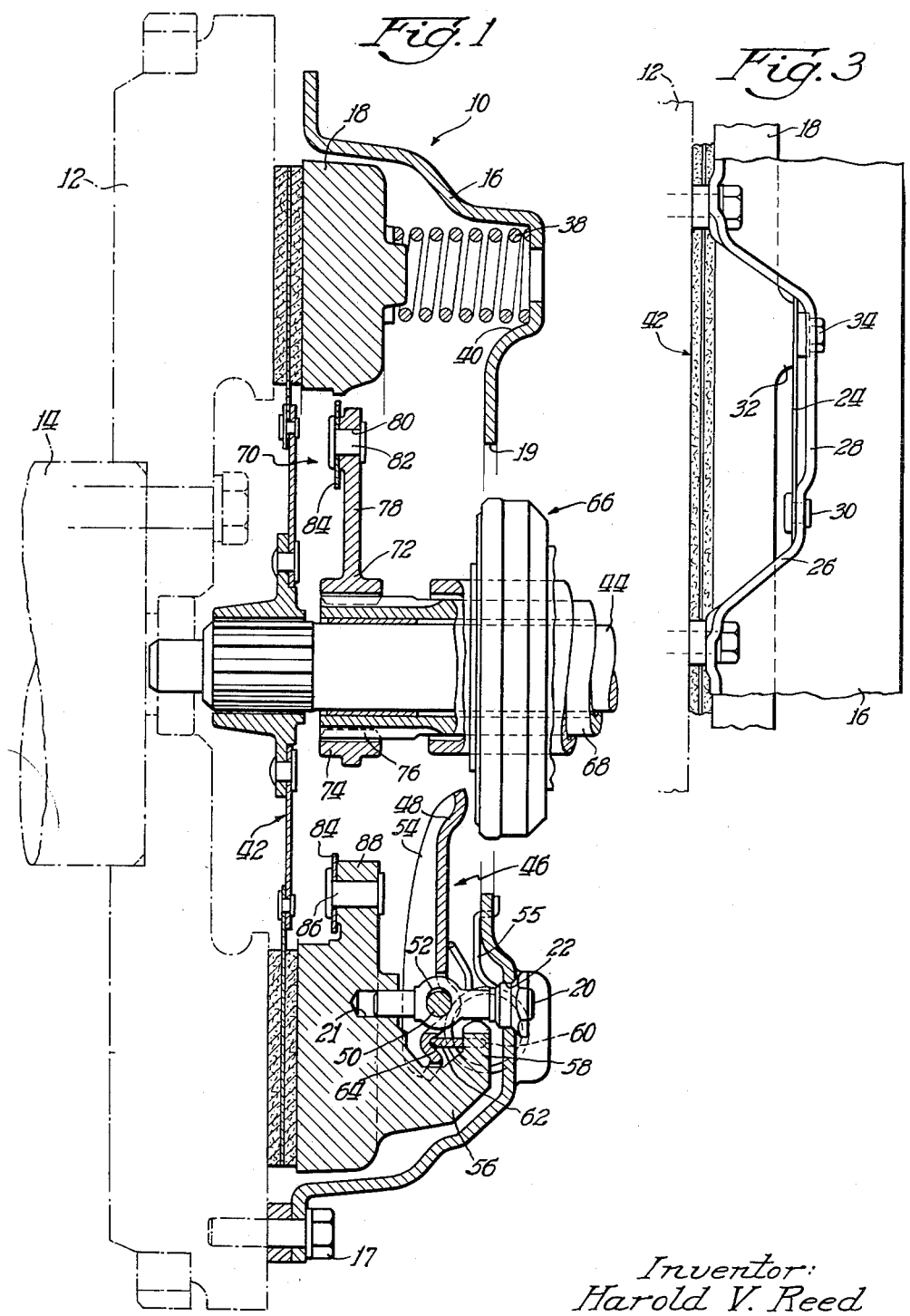
Inventor:
Harold V. Reed
By: Francis T. Drumm Atty.

Jan. 16, 1962   H. V. REED   3,017,003
CLUTCH
Filed Nov. 24, 1958   2 Sheets-Sheet 2
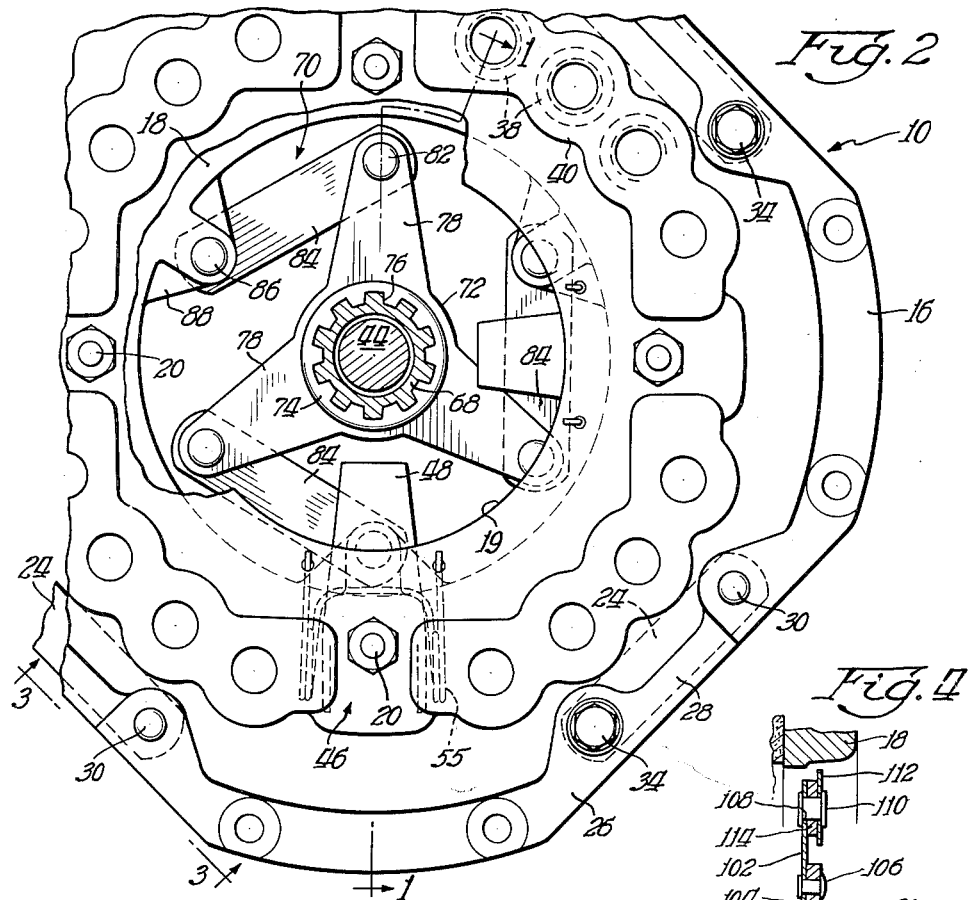
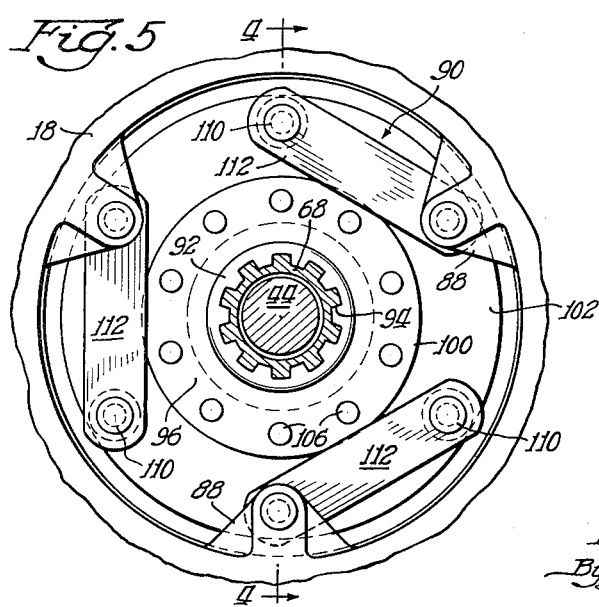
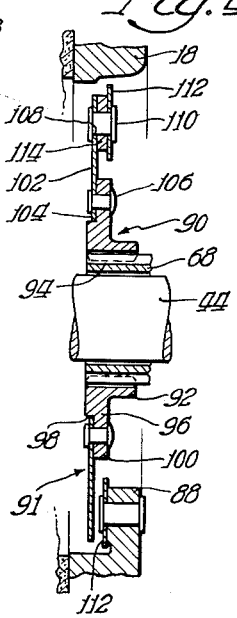
Inventor:
Harold V. Reed
By: Francis T. Drumm  Atty.

3,017,003
CLUTCH
Harold V. Reed, Chicago, Ill., assignor to Borg-Warner Corporation, Chicago, Ill., a corporation of Illinois
Filed Nov. 24, 1958, Ser. No. 775,985
15 Claims. (Cl. 192—68)

This invention relates to clutches and more particularly to a clutch of the type having a continuously driven power take-off in addition to the conventional selectively interruptable output.

Heretofore, clutches of this type have been characterized by two output shafts one of which was connected to the conventional cover plate. A common form of clutch has been one in which one of the output shafts is a sleeve shaft surrounding the other of the output shafts, in which a hub is splined or otherwise affixed to the sleeve shaft and in which an annular dished stamping connects the hub with an offset marginal edge of the cover plate surrounding the rear opening. A disadvantage of this arrangement has been that the load of the power take-off shaft has been carried by the main bearing and disengagement of the clutch has been cumbersome because of the stamping extending between the cover plate and the power take-off shaft.

A primary object of the invention is to provide a clutch of the type described in which the construction of the cover plate is simplified, in which the need for the annular stamping is obviated, and in which the output shaft is connected to the pressure plate.

A further object of the invention is to provide a clutch of the stated character in which is provided a power take-off assembly which serves as a bearing and relieves the load of the power take-off shaft from the main bearing.

Another object of the invention is to provide a clutch of the power take-off type having an annular pressure plate normally biased into engagement with a driven plate connected to one output shaft, a power take-off assembly connecting the pressure plate with a second output shaft in which the power take-off assembly is resiliently connected to the pressure plate so that relative axial movement with respect to the axis of rotation of the shafts is afforded.

A further object of the invention is to provide a clutch of the power take-off type in which the resilient connecting means comprises a plurality of circumferentially spaced substantially tangentially extending resilient straps connecting the power take-off assembly with the inner periphery of the pressure plate.

Another object of the invention is to provide a friction clutch in accordance with the preceding objects in which the power take-off assembly includes a hub connected to a power take-off shaft, a plurality of circumferentially spaced arms extending radially outwardly from and integrally formed with the hub, and a flexible strap connecting the outer end of each arm to the pressure plate.

A further object of the invention is to provide a friction clutch in accordance with the preceding objects in which the power take-off assembly includes a hub connected to a power take-off shaft, a radially extending annular flange integrally formed with the hub, an annular disc secured to the flange and a plurality of flexible links connecting the disc to the pressure plate.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is an elevational view in section, taken substantially on line 1—1 of FIGURE 2, of a power take-off clutch made in accordance with the present invention and shown in operative association with an engine flywheel shown in dot-and-dash lines;

FIGURE 2 is a fragmentary elevational view of the clutch of FIGURE 1 taken as viewed from the right in FIGURE 1;

FIGURE 3 is an enlarged sectional view taken substantially on line 3—3 of FIGURE 2;

FIGURE 4 is a vertical sectional view taken substantially on line 4—4 of FIGURE 5; and FIGURE 5 is a fragmentary elevational view of a modified form of the present invention.

Referring now to the drawings and more particularly to FIGURE 1 the reference numeral 10 indicates the clutch of the present invention shown in operative association with a flywheel 12 and a crank shaft 14 of an engine (not shown). The clutch 10 includes a substantially dish-shaped cover plate 16 which may be secured to the marginal edges of the flywheel 12 by means of capscrews 17 and has at the right side, as viewed in FIGURE 1, a central opening 19. A pressure plate 18 is connected for rotation with the cover plate 16 by means of a plurality of circumferentially spaced eyebolts 20 received in openings 22 on the back face of the cover plate and in registering bores 21 in the pressure plate. In addition, the cover plate 16 is secured to the pressure plate 18 by means of a plurality of circumferentially spaced resilient straps 24, as shown best in FIGURE 3. For this purpose, the cover plate 16 is provided with circumferentially spaced raised portions 26 each of which has a base 28. Each strap 24 is pivotally mounted at one end by means of a rivet 30 and at the other end to a boss 32 on the back side of the pressure plate 18 by means of a capscrew 34. Thus, it will be seen that a driving connection is made between the cover plate 16 and the pressure plate 18 by means of the eyebolts 20 as well as the resilient straps 24.

The pressure plate 18 is normally urged to the left, as viewed in FIGURE 1, by means of a plurality of circumferentially spaced compression springs 38 one end of each of these compression springs being received in a recess 40 on the back side of the cover plate 16. The pressure plate 18 thus locks a driven plate 42 into frictional engagement with the confronting face of the flywheel 12. While the clutch is in the normally engaged position power may be transmitted through the driven plate 42 to an output shaft 44.

Disengagement of the pressure plate 18 from the driven plate 42 may be afforded by a plurality of circumferentially spaced release assemblies 46 of the type described in detail in Patent Number 2,062,101 to Harold Nutt et al., dated November 24, 1936. Each of the assemblies 46 includes a release lever 48, of stamped sheet metal or the like, mounted for pivotal movement about a pin 50 which is received within an enlarged opening 52 in each eyebolt 20. The pin 50 is mounted for a limited transverse floating movement with respect to the axis of each eyebolt 20 and the floating movement is limited by side flanges 54 of the lever 48. The lever construction is conventional and need not be described in further detail. Each lever 48 is normally biased to the position shown in FIGURE 1 by a spring 55, as set forth in the above-mentioned patent.

A plurality of rearwardly projecting portions 56 are formed on the rear face of the pressure plate 18. Each projection 56 includes a hook portion 58 provided with a groove 60 for snubbing reception of one side of a strut 62 the other end of which is received in a transversely extending recess 64 in the lever 48. Release of the pressure plate 18 for disengagement of the driven plate 42 may be afforded by a release bearing 66. As will be understood, the release assembly 66 may be moved to the left, as viewed in FIGURE 1, to engage the inner ends of each of the release levers 48 for pivotal movement of the levers about pins 50 and consequent pivotal movement of the outer ends of each lever 48 to move the associated struts 62 into engagement with the hook 58 of the portion 56. As this movement occurs, the springs 38 are compressed and movement of the plate 18 to the right, as viewed in the same figure, is effected. When the release bearing 66 is moved to the right the pressure plate 18 is again brought into frictional engagement with the driven plate 42 which is then urged into frictional engagement with the confronting face of the flywheel 12. The axial movement of the pressure plate 18 with respect to the cover plate 16 is afforded by the flexible straps 24 and by the positioning of the eyebolts 20 with respect to the bores 21.

According to the present invention, a second output shaft 68, of the sleeve type, surrounds the output shaft 44 and a power take-off assembly 70 is provided to connect the plate 18 directly with the sleeve shaft 68. The power take-off assembly 70 includes a driven plate 72 which, in the preferred form of the invention, takes the form of a hub 74 positively secured to the output shaft 68 as by splining or the like at 76 and a plurality of circumferentially spaced radially outwardly extending arms 78 each of which is apertured at 80 for reception of a rivet 82. Secured to each of the rivets 82 is one end of a flexible strap 84, of spring steel or the like. The other end of each of the straps 84 is connected by means of a rivet 86 to a lug or ear 88 extending radially inwardly from the inner periphery of the pressure plate 18. By the illustrated spacing of the straps 84 drive may be transmitted while maintaining the axis of the pressure plate 18 concentric with the axis of the shaft 68. It will be apparent that power may be continuously transmitted to the power take-off shaft 68 even when the shaft 44 is inoperative.

In FIGURES 4 and 5 is shown a modified form of the present invention in which a power take-off assembly 90 is provided in lieu of the power take-off assembly 70 of the principal form of the invention. The power take-off assembly 90 includes a driven plate 91 including a hub 92 splined to the sleeve shaft 68 at 94 and provided with a radially outwardly extending flange 96 having at one side thereof a shoulder 98 defining a marginal edge portion 100 of reduced thickness. An annular disc 102 has an inner periphery 104 in abutment with the shoulder 98 and the inner marginal edge of the disc 102 is secured by means of a plurality of circumferentially spaced rivets 106 to the outer marginal edge of the flange 96. The outer marginal edge of the disc 102 is provided with a plurality of circumferentially spaced openings 108 for reception of rivets 110 to each of which is connected one end of a resilient strap 112, of spring metal or the like, similar to the straps 84. A spacing collar 114 is interposed between each of the straps 112 and the confronting face of the disc 102. The other end of each of the straps 112 is connected to one of the lugs or ears 88 extending radially inwardly from the inner periphery of the pressure plate, as in the principal form of the invention.

The clutch of the above described type exhibits important advantages over the power take-off clutch heretofore known. For example, axial movement of the pressure plate 18 with respect to the output shaft 68 is facilitated by the use of either the power take-off assembly 70 of the principal form of the invention or the power take-off assembly 90 of the modified form of the invention. In each instance, the pressure plate 18 may move axially when the clutch is disengaged without disturbing the driving relation between the pressure plate and the output shaft 68. In addition, the load of the shaft 68 is removed from the main bearing. The rear opening of the cover plate 16 remains free for movement of the release bearing assembly 66. By this arrangement, as will be apparent, the output shaft 68 may be constantly driven when the clutch is disengaged and power is no longer transmitted to the output shaft 44.

While I have described my invention in connection with certain specific constructions and arrangements, it is to be understood that this is by way of illustration and not by way of limitation and the scope of my invention is defined solely by the appended claims which should be construed as broadly as the prior art will permit.

I claim:

1. In a clutch assembly having a cover plate connectible to a flywheel, an annular pressure plate connected to said cover plate for rotation therewith, a driven plate connectible to a first output shaft, spring means for biasing said pressure plate into engagement with said driven plate, a plurality of circumferentially spaced pivotally mounted release levers engaging said pressure plate, a release bearing assembly axially movable selectively to engage said release levers and thereby afford disengagement of said pressure plate from said driven plate, a second output shaft, the improvement comprising a power take-off assembly including a second driven plate fixed to said second output shaft and means resiliently connecting said pressure plate to said second driven plate providing for relative axial displacement therebetween.

2. A clutch in accordance with claim 1 wherein said second driven plate comprises a hub connected to said second output shaft, a plurality of radially extending arms integrally formed with said hub, and a plurality of resilient straps pivotally connecting the outer ends of said arms with the inner periphery of said pressure plate.

3. A clutch in accordance with claim 1 wherein said pressure plate is provided with a plurality of lugs extending radially inwardly from the inner periphery thereof and wherein said second driven plate includes a hub, a radially outwardly extending flange formed integrally with said hub, an annular disc secured to said flange, and wherein a plurality of flexible straps connect the outer marginal edge of said disc with the lugs of said pressure plate.

4. In a clutch system comprising a cover plate connectible to the flywheel of a vehicle engine and adapted to be driven thereby, a pressure plate connected for rotation with said cover plate, a first output shaft, a driven plate connected to said output shaft, spring means for normally urging said pressure plate into frictional engagement with said driven plate, a second output shaft, the improvement comprising a power take-off assembly including a second driven plate having a hub connectible to the second output shaft, and flexible means connecting said second driven plate to said pressure plate providing for relative axial movement therebetween.

5. In a clutch system comprising a cover plate connectible to the flywheel of a vehicle engine and adapted to be driven thereby, an annular pressure plate connected for rotation with said cover plate and having a plurality of circumferentially spaced radially inwardly extending lugs, a first output shaft, a driven plate connected to said output shaft, spring means for normally urging said pressure plate into frictional engagement with the flywheel, a second output shaft, the improvement comprising a power take-off assembly including a second driven plate having a hub connectible to the second output shaft and having a radially outwardly extending flange, and resilient means connecting said flange to said pressure plate providing for relative axial movement therebetween.

6. A power take-off assembly for a clutch system having a cover plate connectible to an engine flywheel and drivable thereby, a pressure plate connected for rotation with said cover plate, a first output shaft, a driven plate drivingly connected to said first output shaft, spring means, said spring means being operative to urge said pressure plate into frictional engagement with said driven plate, a second output shaft; comprising a second driven plate connectible to said second output shaft and resilient means connecting said second driven plate and said pressure plate providing for relative axial movement therebetween.

7. A power take-off assembly in accordance with claim 6 wherein said resilient means comprises a plurality of flexible straps pivotally connected to the outer marginal edge of said second driven plate and the inner periphery of said pressure plate.

8. In a friction clutch having an axially movable pressure plate, a driven plate, resilient means normally biasing said pressure plate into frictional engagement with said driven plate, a first output shaft, said driven plate being connected to said first output shaft, a second output shaft, the improvement comprising resilient means connecting said pressure plate with said second output shaft providing for relative axial movement therebetween.

9. A friction clutch in accordance with claim 8 wherein said means comprises a hub fixed to said second output shaft, a plurality of circumferentially spaced radially outwardly extending arms integral with said hub, and a plurality of resilient straps each connected at one end to the outer end of each of said arms and at the other end to the inner periphery of said pressure plate.

10. A friction clutch in accordance with claim 8 wherein said pressure plate is provided with a plurality of radially inwardly extending lugs and wherein said means comprises a hub fixed to said second output shaft, a plurality of circumferentially spaced radially outwardly extending arms integral with said hub, and a plurality of resilient straps each connected at one end to the outer end of each of said arms and at the other end to the lugs at the inner periphery of said pressure plate.

11. A friction clutch in accordance with claim 8 wherein said means comprises a hub fixed to said second output shaft, a radially extending flange integrally formed with said hub, an annular disc, a plurality of rivets securing the inner marginal edges of said disc to the outer marginal edges of said flange, a plurality of circumferentially spaced resilient straps each pivotally connected at one end to the outer marginal edge of said disc and at the other end to the inner periphery of said pressure plate.

12. A friction clutch assembly comprising a flywheel, an annular cover plate secured to said flywheel, an annular pressure plate, a driven plate, a first output shaft, said driven plate being drivingly connected to said output shaft, spring means extending between said cover plate and said pressure plate for biasing said pressure plate into engagement with said driven plate and for urging said driven plate into frictional engagement with said flywheel, said pressure plate having a plurality of radially inwardly extending lugs at the inner periphery thereof, release means for moving said pressure plate axially against the force of said spring means to disengage said driven plate from said pressure plate and said flywheel, a second output shaft, means connecting said second output shaft and said pressure plate so that said second output shaft may be driven when the clutch is disengaged, said means including a second driven plate, and a plurality of circumferentially spaced resilient straps pivotally connecting the outer marginal edge of said second driven plate with the lugs of said pressure plate.

13. A friction clutch assembly in accordance with claim 12 wherein said means includes a hub fixed to said output shaft, a plurality of circumferentially spaced arms formed integrally with said hub, and a plurality of resilient straps connecting the outer ends of said arms with the lugs of said pressure plate.

14. A friction clutch assembly in accordance with claim 12 wherein said means includes a hub fixed to said second output shaft, a radially outwardly extending flange formed integrally with said hub, an annular disc, means securing the inner marginal edge of said annular disc to the outer marginal edge of said flange, and a plurality of circumferentially spaced resilient straps connecting the outer marginal edge of said disc with the lugs of said pressure plate.

15. A friction clutch assembly comprising a flywheel, an annular cover plate secured to said flywheel, an annular pressure plate, a driven plate, a first output shaft, said driven plate being drivingly connected to said first output shaft, spring means extending between said cover plate and said pressure plate for biasing said pressure plate into frictional engagement with said driven plate and for urging said driven plate into frictional engagement with said flywheel, said pressure plate having a plurality of radially inwardly extending lugs at the inner periphery thereof, release means for moving said pressure plate axially against the force of said spring means to disengage said driven plate from said pressure plate and said flywheel, a second output shaft, and resilient means connecting said second output shaft and said pressure plate providing for relative axial movement therebetween so that said second output shaft may be driven when the clutch is disengaged.

References Cited in the file of this patent
UNITED STATES PATENTS

| | | |
|---|---|---|
| 2,247,478 | Burtnett | July 1, 1941 |
| 2,270,467 | Nutt | Jan. 20, 1942 |
| 2,672,226 | Zeidler | Mar. 16, 1954 |
| 2,674,892 | Keese et al. | Apr. 13, 1954 |